(12) United States Patent
Shida

(10) Patent No.: US 7,064,163 B2
(45) Date of Patent: Jun. 20, 2006

(54) POLYOLEFIN-BASED ADHESIVE RESINS AND METHOD OF MAKING ADHESIVE RESINS

(75) Inventor: Mitsuzo Shida, Long Grove, IL (US)

(73) Assignee: MSI Technology LLC, Arlington Heights, IL (US)

( * ) Notice: Subject to any disclaimer, the term of this patent is extended or adjusted under 35 U.S.C. 154(b) by 0 days.

(21) Appl. No.: 10/612,031

(22) Filed: Jul. 2, 2003

(65) Prior Publication Data

US 2004/0044131 A1    Mar. 4, 2004

Related U.S. Application Data

(60) Provisional application No. 60/408,022, filed on Sep. 4, 2002.

(51) Int. Cl.
*C08L 51/00*    (2006.01)

(52) U.S. Cl. .............. 525/70; 525/80; 525/78; 525/85

(58) Field of Classification Search .............. 525/70, 525/78, 80, 85
See application file for complete search history.

(56) References Cited

U.S. PATENT DOCUMENTS

| | | | |
|---|---|---|---|
| 4,087,587 A | 5/1978 | Shida et al. | |
| 4,087,588 A | 5/1978 | Shida et al. | |
| 4,298,712 A | 11/1981 | Machonis, Jr. et al. | |
| 4,409,364 A | 10/1983 | Schmukler et al. | |
| 4,416,944 A | 11/1983 | Adur | |
| 4,419,408 A | 12/1983 | Schmukler et al. | |
| 4,423,117 A | 12/1983 | Machonis, Jr. et al. | |
| 4,430,135 A | 2/1984 | Schmukler et al. | |
| 4,452,942 A | 6/1984 | Shida et al. | |
| 4,460,632 A | 7/1984 | Adur et al. | |
| 4,460,745 A | 7/1984 | Adur et al. | |
| 4,472,555 A | 9/1984 | Schmukler et al. | |
| 4,477,532 A | 10/1984 | Schmukler et al. | |
| 4,481,262 A | 11/1984 | Shida et al. | |
| 4,486,469 A | 12/1984 | Machonis, Jr. et al. | |
| 4,487,885 A | 12/1984 | Adur et al. | |
| 4,537,836 A | 8/1985 | Adur et al. | |
| 5,070,143 A | 12/1991 | Pucci et al. | |
| 5,137,975 A * | 8/1992 | Kelusky | 525/263 |
| 5,709,953 A | 1/1998 | Goto et al. | |
| 5,733,085 A | 3/1998 | Shida et al. | |
| 5,741,843 A * | 4/1998 | Koblitz et al. | 524/505 |
| 5,744,553 A * | 4/1998 | Kempter | 525/333.8 |
| 6,194,485 B1 * | 2/2001 | Hogan et al. | 523/166 |
| 6,358,622 B1 | 3/2002 | Shida et al. | |
| 6,448,343 B1 * | 9/2002 | Schombourg et al. | 525/288 |
| 6,451,865 B1 * | 9/2002 | Migchels et al. | 521/54 |
| 6,467,676 B1 | 10/2002 | Wang | |
| 6,730,292 B1 * | 5/2004 | Yang et al. | 424/70.11 |
| 6,730,736 B1 * | 5/2004 | Kaita et al. | 525/70 |
| 6,805,959 B1 * | 10/2004 | Dey et al. | 428/421 |

FOREIGN PATENT DOCUMENTS

WO    WO99/52980    * 10/1999

* cited by examiner

*Primary Examiner*—Jeffrey Mullis
(74) *Attorney, Agent, or Firm*—Welsh & Katz, Ltd.

(57) ABSTRACT

A method for producing polyolefin-based adhesive resins having improved physical and optical properties and the improved adhesive resins thereby produced, eliminates at least one reheating and melting of polyolefin polymer, comprises polymerizing a monomer composition of at least one olefin, mixing the polymerization product without pelletizing the polyolefin polymer with at least one graft polymer or copolymer in a heated mixing device at a temperature above the melting point of the components, and recovering the resulting polyolefin-based adhesive resin.

34 Claims, No Drawings

POLYOLEFIN-BASED ADHESIVE RESINS AND METHOD OF MAKING ADHESIVE RESINS

This application claims priority from U.S. Provisional Application No. 60/408,022, filed Sep. 4, 2002.

FIELD OF THE INVENTION

The present invention relates to the production of polyolefin-based adhesive resins, and particularly to an improved process for producing polyolefin-based adhesive resins.

BACKGROUND OF THE INVENTION

Conventional polyolefin-based adhesive resins for bonding to or bonding together polyolefins and polar materials such as nylon, ethylene vinyl alcohol copolymer, metals and the like, are made using multiple step processes. First, an olefin, such as ethylene, commonly in gaseous form, is polymerized or co-polymerized with other monomers to form a polyolefin and extruded into pellets as a finished form.

Second, at least some polyolefin thus prepared must be further chemically reacted with a chemical having a polar functional group to provide a modified ("grafted") polyolefin having a polar functionality (herein referred to as a "graft"). One way of performing this step is to visbreak the polyolefin in the molten state under conditions of high shear and/or temperature, in the presence of the polar monomer, to cause formation of free radicals that then react with the polar monomer. Another way is to dissolve the polyolefin in a solvent along with the polar monomer in the presence of a peroxide catalyst or other suitable catalyst that facilitates chemical grafting of the monomer onto the polyolefin in solution. Either process results in a polyolefin grafted with a polar monomer. The graft copolymer thus prepared is then typically pelletized in an extruder.

Third, the graft copolymer is typically melt-blended with an additional quantity of polyolefin to dilute the graft copolymer to a desired concentration, and to provide a polyolefin-based adhesive resin that has processing and physical properties suitable for the end use application. The mixing is usually performed by melting the polyolefin pellets and the graft pellets above the melting point of the two components and mixing the melted materials to desirably obtain a homogenous product. This additional melt blending is yet another expense. The polyolefin-based adhesive resin thus prepared is then pelletized from an extruder.

There is a need for a less expensive, less complicated process for producing polyolefin-based adhesive resins. There is also a need for a better quality polyolefin-based adhesive resin.

An example of a process for producing polyolefin-based adhesive resin is described in U.S. Pat. No. 4,487,885, issued Dec. 11, 1984. The process described therein utilizes a major amount of polyolefin polymer or polymers, which, as described above, has been formed by polymerizing an olefin or olefins and extruded into pellets as a finished form. The pelletized polymer or polymers are next mixed with graft and heated to above the melting point of the components under high shear. A heated extruder may be used to accomplish the latter step, and the melt mixed product can be recovered in the form of pellets. As noted in the patent, the product of the process may consist of from about 70–99.5 wt. % of polyolefin, e.g. polyethylene, and about 0.05–30 wt. % of the graft.

While conventional processes for producing polyolefin-based adhesive resins have been found to be useful, there are several disadvantages inherent in those processes. For example, in heating and shearing the polymerized polyolefin, e.g. polyethylene, usually in the form of pellets, above its melting point, imperfections, usually in the form of gelled polymer, are formed with each such heat history. The least amount of such imperfections is desired so that the adhesive resin when applied to a substrate will be continuous and without visible and/or functional imperfections.

Additionally, the conventional processes described above are costly due to the additional equipment and the energy required to first polymerize the olefin monomer, pelletize the polyolefin, and then melt and mix the formed polyolefin and graft material to form the adhesive product.

Thus there is a need for an improved process for producing polyolefin-based adhesive resins which reduces the amount of imperfections, such as gelled polymer, of the polyolefin material by eliminating one melt processing and extrusion step after the polymerization. There is also a need for a process that reduces the time, energy and equipment required to produce the desired polyolefin-based adhesive resins.

SUMMARY OF THE INVENTION

One object of the present invention is to provide an improved process for producing polyolefin-based adhesive resins.

Another object of this invention is to provide a process for producing polyolefin-based adhesive resins that reduces the amount of imperfections in the produced adhesive resin.

Another object of this invention is to provide a process for producing polyolefin-based adhesive resins that improves properties, such as optical properties in thin films of the produced adhesive resin as compared to polyolefin-based adhesive resins produced by heretofore conventional processes.

Still another object of this invention is to provide an improved process for producing polyolefin-based adhesive resin that reduces the time, energy and equipment required to produce the adhesives as compared to conventional processes for such production.

These and other objects and advantages of the present invention will be apparent from the following description.

As explained above, in heretofore known processes the polyolefin that is graft polymerized to form a polyolefin-based adhesive resin is exposed to at least two, and often three, melt extrusion and pelletizing steps before it can be sold for commercial use. Additional polyolefin used in the resin is exposed to two melt extrusion and pelletizing steps, once following synthesis of the polyolefin and once while mixing the polyolefin with the graft copolymer. The present invention is directed to a process that eliminates at least one of the melt processing and extrusion steps for the polyolefin-based adhesive resin, and to an improved polyolefin-based adhesive resin thus prepared.

In accordance with the present invention, a process is provided that advantageously eliminates the need for reheating and melting of polyolefin polymer and reduces imperfections due to such reheating and melting of polymer, in producing polyolefin-based adhesive resins. The term "polyolefin" is defined as including homopolymers and copolymers of olefin monomers having from 2–12 carbon atoms. Examples of suitable polyolefins include without limitation high density polyethylene (linear ethylene polymers having a density of at least 0.945 grams/cm$^3$), branched low density polyethylene (branched ethylene polymers having a density of about 0.900 to about 0.944 grams/cm$^3$), linear low density polyethylene (linear ethylene-alpha olefin copolymers having a density of about 0.870 to about 0.944 grams/cm$^3$ and including a $C_3$ to $C_{12}$ alpha-olefin comonomer), polypropylene homopolymers, propylene-ethylene copolymers, butene-1 homopolymers and copolymers, and the like. The term "polyolefin" also includes copolymers of olefins such as ethylene with vinyl acetate, methyl acrylate, methyl methacrylate, ethyl acrylate, ethyl methacrylate, butyl acrylate, acrylic acid, methacrylic acid, acid terpolymers and the like, which contain at least 50% by weight ethylene.

The process comprises polymerizing an olefin, mixture of olefins or mixture of olefins and other monomers, where preferably the olefin or olefins have from about 2 to 8 carbon atoms, for example by polymerizing at least one olefin monomer mixture using a conventional reactor process, and mixing the polymerization product with a graft and either with or without another component, such as an adhesion promoting resin, preferably elastomer, and more preferably a thermoplastic elastomer, or a metallocene catalyzed polyolefin, in a heated extruder or other heated mixing device at a temperature above the melting point of the components to obtain the desired grafted polyolefin-based adhesive resin.

The process may be utilized to produce adhesives based on any olefin to produce corresponding polyolefin-based adhesive resins of such polyolefins, for example, high density polyethylene (HDPE), polypropylene, and the like, and copolymerizations in a single or more than one polymerization reactors, in series or in parallel. In the case of polyethylene as a polyolefin, the olefin monomers include ethylene and less than 50% of one or more other monomers, which may include alkenes, for example, propylene, butene-1, hexene-1, 4-methyl pentene-1, octene-1, and other unsaturated aliphatic hydrocarbons; also, ethylenically unsaturated esters, such as vinyl acetate, methyl acrylate, ethyl acrylate and butyl acrylate.

"Graft" as heretofore defined is understood to include any of the functional polymeric compositions or other structures as described in U.S. Pat. Nos. 3,658,948; 3,697,465; 3,862,265; 3,868,433; 4,087,587; 4,087,588; 4,487,885; 5,070,143 and others.

In accordance with the invention, a polyolefin is synthesized by a conventional process. The polyolefin from the reactor is fed to a mixing device, such as a mixing extruder, where it is combined with a graft copolymer in pellet or powder form that has been separately produced, prior to pelletizing to form a polyolefin-based adhesive resin. The graft copolymer can be the reaction product of a thermoplastic polymer and a polar monomer, and may be produced according to a known technique. As described, the polyolefin is melt blended with the graft copolymer in a mixing device, preferably a mixing extruder, to yield a polyolefin-based adhesive resin. The adhesive resin is discharged from the mixing device, preferably a mixing extruder, through a die having multiple openings, and is cooled and pelletized.

The process of the invention reduces the number of melt extrusion and pelletizing steps for the ungrafted polyolefin portion of the adhesive from two to one. The only melt extrusion and pelletizing seen by the polyolefin occurs in the reactor's existing in-line mixing device after synthesis of the polyolefin, after it is blended with the graft copolymer. This reduction in melt mixing and melt extrusion history is significant because the polyolefin (excluding the graft copolymer) often constitutes 80–99% of the polyolefin-based adhesive resin.

Polyolefin-based adhesive resins produced according to the invention have less degradation, less crosslinking and better (whiter) color than conventional polyolefin-based adhesive resins having more extensive heat histories. Films produced using the improved polyolefin-based adhesive resin, tend to have better optical properties, including increased clarity, less haze and/or less gels. The polyolefin-based adhesive resin of the invention is also less expensive to manufacture.

The polyolefin-based, grafted copolymer adhesive resin obtained by the process of the present invention is particularly useful in a variety of applications, particularly for bonding to materials or bonding materials together, for example such materials as polyolefins, polyamides, polyvinyl alcohol, ethylene vinyl alcohol copolymer, metals, glass, wood and/or paper, and other substrates, particularly polar substrates; and in fabrication processes, such as powder coating, rotational molding, film-forming processes using standard cast film and blown film extrusion and coextrusion processes; application to multiple substrates using thermal lamination, extrusion lamination, and extrusion and coextrusion processes including blow molding, sheet extrusion, and pipe.

DESCRIPTION OF THE PREFERRED EMBODIMENTS

In a preferred embodiment, the process of the present invention is desirably performed by polymerizing ethylene with other olefin monomers according to known polymerization techniques, and mixing the raw product of the polymerization with a graft as heretofore described. The olefin monomer mixture may have the composition of primarily ethylene with less than 50% of other alkenes as heretofore described.

In accordance with a particular embodiment of this invention, the polyolefin is fed to a mixing extruder immediately following synthesis. A graft copolymer that has been separately manufactured, is added to the same mixing extruder and is blended with the polyolefin prior to pelletizing. The graft copolymer may be based on the same or different polyolefin as the synthesized polyolefin, and is desirably based on a similar polyolefin. The graft copolymer may also be based on a thermoplastic elastomer, such as an ABA block copolymer having polystyrene end blocks and an olefin or diolefin midblock. Such elastomers are described in U.S. Pat. No. 5,070,143, the disclosure of which is incorporated by reference. The resulting graft polyolefin-based adhesive resin is then extruded through a die having multiple openings and is cooled and pelletized.

The polyolefin-based adhesive resin produced according to the embodiment may include from about 0.05 to about 30% by weight of the graft copolymer, preferably from about 1 to about 20% by weight of the graft copolymer, and most preferably from about 2 to about 15% by weight of the graft copolymer. Additional adhesion-promoting resins, such as thermoplastic elastomers, may also be added and blended with the polyolefin and graft copolymer at this stage. When used, the thermoplastic elastomer may constitute from about 1 to about 30% by weight of the polyolefin-based adhesive resin. The balance of the polyolefin-based adhesive resin is substantially the polyolefin that was just synthesized. The polyolefin may constitute from about 50 to about 99.9% by weight of the polyolefin-based adhesive, preferably from about 70 to about 99% by weight, and most preferably from about 85 to about 98% by weight.

The graft copolymer is a copolymer of a polyolefin or thermoplastic elastomer as described above, and a polar comonomer. The term "polar comonomer" refers to organic molecules (e.g. monomers) having a carboxyl, hydroxyl, anhydride or other oxygen functionality. When grafted onto polyolefins and/or thermoplastic elastomers, these monomers exhibit polar attraction to, and under certain conditions may chemically react with, polar surfaces of polyolefins, polyamides, polyvinyl alcohol, ethylene vinyl alcohol copolymer, metals, glass, wood and/or paper and other substrates. Suitable polar monomers include without limitation carboxylic and dicarboxylic acids and their anhydrides, for instance maleic acid, fumaric acid, maleic anhydride; 4-methylcyclohex-4-ene-1,2 dicarboxylic acid and its anydride; tetrahydrophthalic acid and its anhydride; x-methylnorborn-5-ene-2,3 dicarboxylic acid and its anhydride; norborn-5-ene-2,3 dicarboxylic acid and its anhydride; maleo-pimaric acid and its anhydride; bicyclo(2.2.2) oct-5-ene-2,3-dicarboxylic acid and its anhydride; 1, 2, 3, 4, 5, 8, 9, 10-octahydronaphthalene-2,3-dicarboxylic acid and its anhydride; 2-oxa-1,3,-diketospiro (4.4)non-7-ene, bicyclo (2.2.1)hept-5-ene-2,3-dicarboxylic acid and its anhydride; nadic anhydride, methyl nadic anhydride, himic anhydride, and methyl himic anhydride. Other suitable polar monomers are described in U.S. Pat. Nos. 3,873,643 and 3,882,914, the disclosures of which are incorporated by reference.

In the embodiment of the invention described above, the graft copolymer can be produced using a conventional process. Conventional grafting processes include without limitation a) processes where the polyolefin or thermoplastic elastomer is reacted with the polar comonomer in the presence of sufficient heat and shear to visbreak the molten polymer and form free radicals which react with the monomer, b) processes where the molten polyolefin or thermoplastic elastomer is reacted with the polar monomer in the presence of heat and a catalyst, such as a peroxide catalyst, and c) processes where the polyolefin or thermoplastic elastomer is reacted with the polar monomer in a suitable solvent, in the presence of a catalyst. An exemplary process for preparing a graft copolymer is described in U.S. Pat. No. 4,087,587, the disclosure of which is incorporated by reference. The graft copolymer may include from about 85 to about 99.999% by weight of the base polymer and from about 0.001 to about 15% by weight of the grafted polar monomer, preferably from about 95 to about 99.99% by weight of the polyolefin and from about 0.01 to about 5% by weight of the grafted polar monomer; preferably from about 97 to about 99.9% by weight of the polyolefin and from about 0.1 to about 3% by weight of the grafted polar monomer.

EXAMPLE

In this example, ethylene and butene gases were introduced into the polymerization reactor of a commercial large-scale polyethylene manufacturing system. The mixture was polymerized in the reactor using a suitable Zeigler-Natta catalyst, forming an ethylene-butene copolymer, commonly referred to as linear low density polyethylene (LLDPE). The LLDPE polymerization product with a density of 0.918 g/cc was then discharged from the reactor in the form of a powder and fed into an accumulator bin in line with the reactor, and then was combined with graft as the LLDPE was transported into a continuous mixer. The graft was a high density polyethylene grafted with maleic anhydride. Maleic anhydride content, based on combined weight of the polymers, was 0.2%. The LLDPE powder and the graft copolymer were heated to a temperature of approximately 400–450 degrees F. and subjected to shear mixing. Following mixing, the mixture was pelletized as it exited the mixer. Six-185,000 pound lots of pelletized polyolefin-based adhesive resin were thus produced by the process of the present invention. This experiment was performed by Equistar Chemicals, LP using a large-scale polyethylene manufacturing facility (480 million pounds per year capacity).

COMPARATIVE EXAMPLE

For comparative purposes, LLDPE, which had been previously manufactured in the reactor and pelletized, was mixed with the same graft copolymer as noted above in the same proportions, in a continuous mixer heated to a temperature of approximately 400–450 degrees F. and subjected to shear mixing. The mixture was pelletized as it exited the mixer. This pelletized product is utilized as the CONTROL in the following tests.

Test 1

To determine the amount of undesirable gelled polymer in the adhesive product, pellets of adhesive produced above in accordance with the present invention, referred to as Lots 1–6, and pellets of CONTROL produced as described above, were separately introduced into a single screw extruder, and extruded into a blown 3 mil monolayer film. The amount of gelled polymer in the films of Lots 1–6 and of the CONTROL were determined by counting the number of gelled polymer or gels in a given area of the film and normalizing the count for a 50 square foot area by a laser gel scanner. The following counts were found:

| Gel Count | |
|---|---|
| Lot 1 | 2582 |
| Lot 2 | 2360 |
| Lot 3 | 2499 |
| Lot 4 | 2206 |
| Lot 5 | 1930 |
| Lot 6 | 2177 |
| Lots 1–6 (averaged) | 2292 |
| CONTROL | 3423 |

Thus, TEST 1 shows the desired reduction in the amount of imperfections due to gelled polymer in polyolefin-based adhesive resin produced in accordance with the present invention as compared to the amount of imperfections due to gelled polymer of polyolefin-based adhesive resin produced under the heretofore known conventional processes.

The optical properties of films prepared as in TEST 1 were evaluated as noted in the following tests:

Test II

Haze, i.e., the clarity of films, in this case of films of 2 mil thickness prepared as noted above, was determined in accordance with ASTM Test No. D-1003, as follows:

| Haze % | |
|---|---|
| Lot 1 | 7.8 |
| Lot 2 | 7.4 |

-continued

| Haze % | |
|---|---|
| Lot 3 | 7.5 |
| Lot 4 | 7.8 |
| Lot 5 | 7.6 |
| Lot 6 | 7.6 |
| Lots 1–6 (averaged) | 7.6 |
| CONTROL | 10.2 |

Test III

The gloss of 2 mil films as noted above was determined in accordance with ASTM Test No. D-2457, with the following results:

| Gloss Units | |
|---|---|
| Lot 1 | 68.8 |
| Lot 2 | 69.8 |
| Lot 3 | 70.5 |
| Lot 4 | 67.9 |
| Lot 5 | 70.0 |
| Lot 6 | 69.1 |
| Lots 1–6 (averaged) | 69.4 |
| CONTROL | 62.7 |

Test IV

Transparency of 2 mil films as noted above was determined in accordance with ASTM Test No. D1746, as narrow angle scatter ("NAS") as follows:

| NAS, % | |
|---|---|
| Lot 1 | 71.9 |
| Lot 2 | 72.5 |
| Lot 3 | 72.4 |
| Lot 4 | 73.1 |
| Lot 5 | 75.1 |
| Lot 6 | 73.8 |
| Lots 1–6 (averaged) | 73.1 |
| CONTROL | 66 |

Test V

Degradation of polyolefin-based adhesive resin produced in accordance with the present invention as compared to that of polyolefin-based adhesive resin produced in accordance with heretofore known processes was demonstrated by measuring the yellowness of 2 mil films prepared as noted above in accordance with ASTM Test No. D1925, with the following results:

| Y1 - (Yellowness) Rating | |
|---|---|
| Lot 1 | 2.5 |
| Lot 2 | 2.5 |
| Lot 3 | 2.2 |

-continued

| Y1 - (Yellowness) Rating | |
|---|---|
| Lot 4 | 2.1 |
| Lot 5 | 1.9 |
| Lot 6 | 1.9 |
| Lots 1–6 (averaged) | 2.2 |
| CONTROL | 6.0 |

The above tests demonstrate the improvement in the reduction of imperfections and degradation upon producing polyolefin-based adhesive resins in accordance with the process of the present invention, as well as the improvement in the optical properties of the films of the adhesive, as compared to polyolefin-based adhesive resins produced according to heretofore known conventional methods. The above testing was performed by Equistar Chemicals, LP.

While the embodiment of the invention described herein is presently preferred, various modifications and improvements can be made without departing from the spirit and scope of the invention. The scope of the invention is indicated by the appended claims, and all changes that fall within the meaning and range of equivalents are intended to be embraced therein.

I claim:

1. A method for producing improved polyolefin-based adhesive resin, comprising:
   a. polymerizing a monomer composition of at least one olefin to a pelletizable polyolefin;
   b. mixing with shear mixing, while minimizing cross-linking, at least 50% by weight based on the polyolefin-based adhesive resin of the polymerization product following polymerization without first pelletizing the pelletizable polyolefin with at least one graft polymer or copolymer in a heated mixing device at a temperature above the melting point of the components; and
   c. recovering the resulting polyolefin-based adhesive resin.

2. The method of claim 1, wherein the polyolefin-based adhesive resin comprises from about 0.05 percent to about 30 percent by weight of graft copolymer.

3. The method of claim 1, further comprising the step of adding an adhesion promoting resin to the heated mixing device.

4. The method of claim 3, wherein the adhesion promoting resin comprises a thermoplastic elastomer.

5. The method of claim 3, wherein the adhesion promoting resin comprises a metallocene catalyzed ethylene copolymer.

6. The method of claim 1, wherein the at least one olefin is an alkene.

7. The method of claim 6, wherein the at least one olefin is ethylene.

8. The method of claim 1, wherein the monomer composition comprises a mixture of ethylene and at least one additional monomer.

9. The method of claim 8, wherein the monomer composition comprises a mixture of more than 50% by weight ethylene and less than 50% by weight of at least one additional monomer.

10. The method of claim 9, wherein the at least one additional monomer is selected from the group consisting of olefins having at least from 2 to 8 carbon atoms, unsaturated aliphatic hydrocarbons and ethylenically unsaturated esters or acids.

11. The method of claim 9, wherein the at least one additional monomer is an alkene monomer selected from the group consisting of propylene, butene-1, hexene-1, 4-methyl pentene-1, and octene-1.

12. The method of claim 9, wherein the at least one additional monomer is an ethylenically unsaturated ester or acid selected from the group consisting of vinyl acetate, methyl acrylate, ethyl acrylate, methyl methacrylate, ethyl methacrylate, butyl acrylate, acrylic acid, and methacrylic acid.

13. The method of claim 1, wherein the at least one olefin is propylene.

14. A fabrication process comprising bonding a polyolefin-based adhesive resin produced according to claim 1 to a substrate.

15. A fabrication process selected from the group consisting of powder coating, rotational molding, film-forming process using standard cast film and blown film extrusion and coextrusion processes, application to multiple substrates using thermal lamination, extrusion lamination, and extrusion and coextrusion processes including blow molding, sheet extrusion, and pipe comprising bonding a polyolefin-based adhesive produced according to claim 1 to a substrate in said process.

16. A method of bonding substrates comprising:
   a. applying to at least one substrate a polyolefin-based adhesive resin produced according to claim 1; and
   b. applying a second substrate to the polyolefin-based adhesive resin applied to the at least one substrate.

17. A method for producing improved polyolefin-based adhesive resin, comprising:
   a. polymerizing a monomer composition to a pelletizable polyolefin selected from the group consisting of an olefin having from 2 to 8 carbon atoms, a mixture of an olefin having from 2 to 8 carbon atoms with a second, different olefin having from 2 to 8 carbon atoms, a mixture of said olefin with at least one other unsaturated aliphatic hydrocarbon, a mixture of said olefin having from 2 to 8 carbon atoms with a second, different olefin having from 2 to 8 carbon atoms and at least one other unsaturated aliphatic hydrocarbon, a mixture of said olefin with at least one ethylenically unsaturated ester or acid, and mixtures thereof;
   b. mixing with shear mixing, while minimizing cross-linking, at least 50% by weight based on the polyolefin-based adhesive resin of the pelletizable polyolefin polymerization product following polymerization without first pelletizing with at least one graft polymer or copolymer in a heated mixing device at a temperature above the melting point of the components; and
   c. recovering the resulting polyolefin-based adhesive resin.

18. The method of claim 17, further comprising the step of adding an adhesion promoting resin to the heated mixing device.

19. The method of claim 18, wherein the adhesion promoting resin comprises a thermoplastic elastomer.

20. The method of claim 18, wherein the adhesion promoting resin comprises a metallocene catalyzed ethylene copolymer.

21. The method of claim 17, wherein the monomer composition is an olefin having from 2 to 8 carbon atoms.

22. The method of claim 21, wherein the monomer composition comprises a mixture of more than 50% by weight ethylene and less than 50% by weight of at least one additional monomer.

23. The method of claim 21, wherein the monomer composition is a mixture of a first olefin having from 2 to 8 carbon atoms and a second different olefin having from 2 to 8 carbon atoms.

24. The method of claim 22, wherein the monomer composition comprises a mixture of ethylene and at least one other unsaturated aliphatic hydrocarbon.

25. The method of claim 22, wherein the monomer composition comprises a mixture of ethylene and an alkene monomer selected from the group consisting of propylene, butene-1, hexene-1, 4-methyl pentene-1, and octene-1.

26. The method of claim 17, wherein the monomer composition comprises a mixture of ethylene and an ethylenically unsaturated ester or acid.

27. The method of claim 26, wherein the monomer composition comprises a mixture of ethylene and an ethylenically unsaturated ester or acid selected from the group consisting of vinyl acetate, methyl acrylate, ethyl acrylate, methyl methacrylate, ethyl methacrylate, butyl acrylate, acrylic acid, and methacrylic acid.

28. The method of claim 17, wherein the monomer composition comprises a mixture of more than 50% by weight ethylene gas and less than 50% by weight butene gas, the graft polymer is at least one polymerizable ethylenically unsaturated carboxylic acid or acid derivative, and the mixing is performed at a temperature above the melting point of the components.

29. A fabrication process comprising bonding a polyolefin-based adhesive resin produced according to claim 17 to a substrate.

30. A fabrication process selected from the group consisting of powder coating, rotational molding, film-forming process using standard cast film and blown film extrusion and coextrusion processes, application to multiple substrates using thermal lamination, extrusion lamination, and extrusion and coextrusion processes including blow molding, sheet extrusion, and pipe comprising bonding a polyolefin-based adhesive produced according to claim 17 to a substrate in said process.

31. A fabrication process comprising bonding a polyolefin-based adhesive resin produced according to claim 28 to a substrate.

32. A fabrication process selected from the group consisting of powder coating, rotational molding, film-forming process using standard cast film and blown film extrusion and coextrusion processes, application to multiple substrates using thermal lamination, extrusion lamination, and extrusion and coextrusion processes including blow molding, sheet extrusion, and pipe comprising bonding a polyolefin-based adhesive produced according to claim 28 to a substrate in said process.

33. A method of bonding substrates comprising:
   a. applying to at least one substrate a polyolefin-based adhesive resin produced according to claim 17; and
   b. applying a second substrate to the polyolefin-based adhesive resin applied to the at least one substrate.

34. A method of bonding substrates comprising:
   a. applying to at least one substrate a polyolefin-based adhesive resin produced according to claim 28; and
   b. applying a second substrate to the polyolefin-based adhesive resin applied to the at least one substrate.

* * * * *